(12) United States Patent
Dai

(10) Patent No.: US 8,299,513 B2
(45) Date of Patent: Oct. 30, 2012

(54) HIGH CONVERSION GAIN IMAGE SENSOR

(75) Inventor: Tiejun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 386 days.

(21) Appl. No.: 12/112,907

(22) Filed: Apr. 30, 2008

(65) Prior Publication Data

US 2009/0272879 A1    Nov. 5, 2009

(51) Int. Cl.
*H01L 27/146* (2006.01)

(52) U.S. Cl. . 257/292; 257/228; 257/291; 257/E27.132; 257/E27.133; 348/294; 348/300; 348/308; 348/E3.018

(58) Field of Classification Search .......... 257/290–292, 257/228, 293, E27.132, E27.133; 348/294, 348/300, 302, 308
See application file for complete search history.

(56) References Cited

U.S. PATENT DOCUMENTS

| | | | |
|---|---|---|---|
| 6,037,577 A * | 3/2000 | Tanaka et al. | 250/208.1 |
| 6,697,111 B1 * | 2/2004 | Kozlowski et al. | 348/302 |
| 6,844,897 B1 * | 1/2005 | Andersson | 348/308 |
| 6,888,572 B1 * | 5/2005 | Kozlowski | 348/308 |
| 7,026,596 B2 | 4/2006 | Fossum | |
| 7,075,049 B2 | 7/2006 | Rhodes et al. | |
| 7,459,667 B1 * | 12/2008 | Lee et al. | 250/214 R |
| 7,569,868 B2 * | 8/2009 | Watanabe et al. | 257/184 |
| 2002/0190215 A1 * | 12/2002 | Tashiro et al. | 250/370.11 |
| 2004/0079977 A1 | 4/2004 | Ying et al. | |
| 2005/0161712 A1 * | 7/2005 | Koyama et al. | 257/292 |
| 2007/0013797 A1 | 1/2007 | McKee | |
| 2007/0046800 A1 * | 3/2007 | Chen et al. | 348/308 |

OTHER PUBLICATIONS

Mabuchi, K. et al. "CMOS Image Sensors Comprised of Floating Diffusion Driving Pixels with Buried Photodiode," IEEE Journal of Solid-State Circuits, vol. 39, No. 12, Dec. 2004, pp. 2408-2416.

* cited by examiner

*Primary Examiner* — Matthew Reames
*Assistant Examiner* — Ermias Woldegeorgis
(74) *Attorney, Agent, or Firm* — Blakely Sokoloff Taylor & Zafman LLP

(57) ABSTRACT

An image sensor includes a photosensitive element, a reset circuit, an amplifier transistor, and a current source. The photosensitive element is coupled to generate an image charge in response to incident light and transfer the image charge to a circuit node. The reset circuit is coupled to selectively reset a voltage at the circuit node. The amplifier transistor includes a gate terminal responsive to the voltage at the circuit node. A current source is coupled between a high level power rail and a second terminal of the amplifier transistor.

9 Claims, 9 Drawing Sheets

HIGH CONVERSION GAIN IMAGE SENSOR

TECHNICAL FIELD

This disclosure relates generally to image sensors, and in particular but not exclusively, relates to CMOS image sensors having a high conversion gain.

BACKGROUND INFORMATION

Image sensors have become ubiquitous. They are widely used in digital still cameras, cellular phones, security cameras, as well as, medical, automobile, and other applications. The technology used to manufacture image sensors, and in particular, complementary metal-oxide-semiconductor ("CMOS") image sensors ("CIS"), has continued to advance at great pace. For example, the demands of higher resolution and lower power consumption have encouraged the further miniaturization and integration of these image sensors.

FIG. 1 is a circuit diagram illustrating pixel circuitry of two four-transistor ("4T") pixel cells Pa and Pb (collectively pixel cells 100) within an image sensor array. Pixel cells Pa and Pb are arranged in two rows and one column and time share a single readout column line (bit line). Each pixel cell 100 includes a photodiode PD, a transfer transistor T1, a reset transistor T2, a source-follower ("SF") or amplifier ("AMP") transistor T3, and a row select ("RS") transistor T4.

During operation, transfer transistor T1 receives a transfer signal TX, which transfers the charge accumulated in photodiode PD to a floating diffusion node FD. Reset transistor T2 is coupled between a power rail VDD and the floating diffusion node FD to reset the pixel (e.g., discharge or charge the FD and the PD to a preset voltage) under control of a reset signal RST. The floating diffusion node FD is coupled to control the gate of AMP transistor T3. AMP transistor T3 is coupled between the power rail VDD and RS transistor T4. AMP transistor T3 operates as a source-follower providing a high impedance connection to the floating diffusion FD. Finally, RS transistor T4 selectively couples the output of the pixel circuitry to the readout column line under control of a signal RS.

In normal operation, the photodiode PD and node FD are reset to the supply voltage VDD by temporarily asserting the reset signal RST and the transfer signal TX. The image accumulation window (exposure period) is commenced by de-asserting the transfer signal TX and permitting incident light to charge the photodiode PD. As photogenerated electrons accumulate on the photodiode PD, its voltage decreases (electrons are negative charge carriers). The voltage or charge on photodiode PD is indicative of the intensity of the light incident on the photodiode PD during the exposure period. At the end of the exposure period, the reset signal RST is de-asserted to isolate node FD and the transfer signal TX is asserted to couple the photodiode to node FD and hence the gate of AMP transistor T3. The charge transfer causes the voltage of node FD to drop from VDD to a second voltage indicative of the amount of charge (e.g., photogenerated electrons accumulated on the photodiode PD during the exposure period). This second voltage biases AMP transistor T3, which is coupled to the readout column line when the signal RS is asserted on RS transistor T4.

The conversion gain of pixel cells 100 is defined as the ratio (R) of the change in voltage $\Delta V$ at node FD after charge transfer to the change in charge $\Delta Q$ of photodiode PD.

$$R = \Delta V / \Delta Q \qquad \text{(Equation 1)}$$

The capacitance of photodiode PD is determined by calculating the amount of charge Q stored for a given amount of voltage applied V.

$$Q = C \cdot V \qquad \text{(Equation 2)}$$

Combining equations 1 and 2, conversion gain (R) is inversely proportional to the capacitance of node FD.

$$R = \Delta V / \Delta Q = \Delta V / C \cdot \Delta V = 1/C \qquad \text{(Equation 3)}$$

In general, it is desirable to design pixel cells 100 to have a high conversion gain R to improve low-light sensitivity. For traditional image sensors, conversion gain can be increased by reducing the capacitance of the floating diffusion. However, as pixel cell sizes continue to shrink, pixel saturation or overexposure in bright environments is becoming more acute. Furthermore, as pixel sizes get smaller and smaller, shared structure pixels are widely used. For shared structure pixels, the floating node FD is connected to several transfer gates. Therefore, the shared structure pixel floating node capacitance cannot be very small. For large pixels, large transfer gates are necessary to avoid image lag and therefore the floating node capacitance cannot be very small. This limit on the size of the floating node capacitance makes it difficult to achieve a high conversion gain in large image sensor pixels.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and method of operation of a high conversion gain pixel cell are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
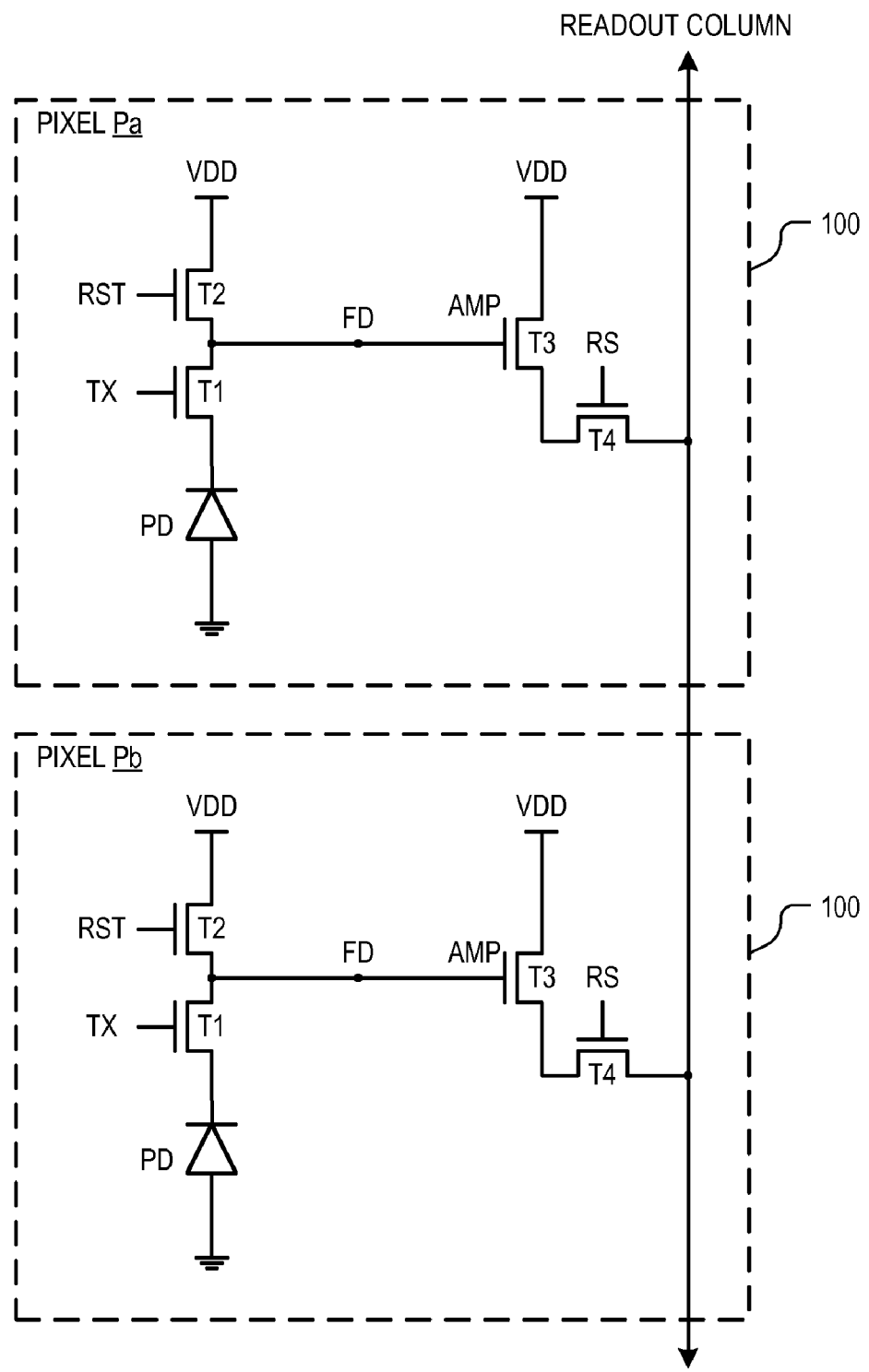
FIG. 1 is a circuit diagram illustrating two conventional pixel cells within an image sensor array.
Figure 2:
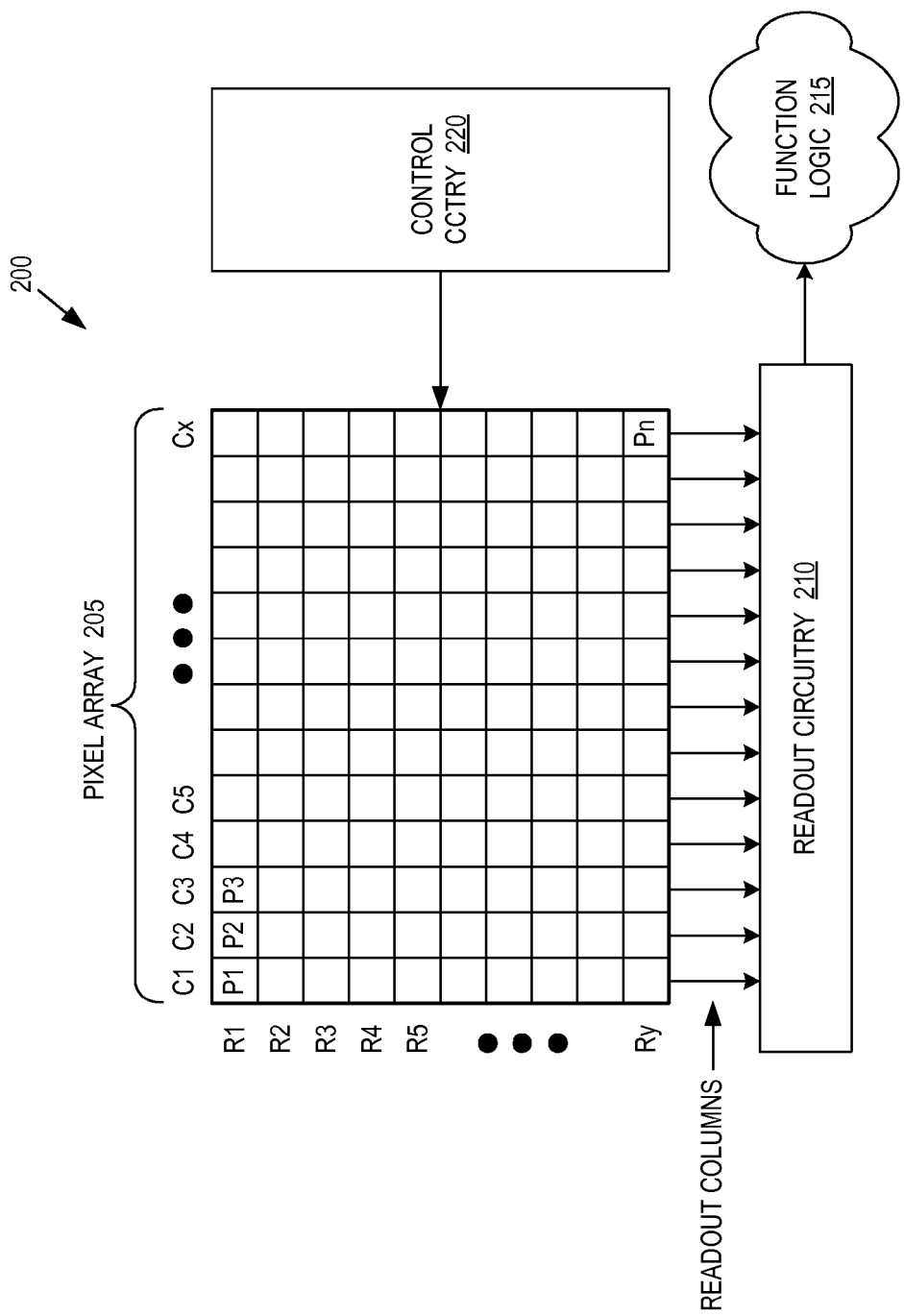
FIG. 2 is a block diagram illustrating an imaging system, in accordance with an embodiment of the invention.

FIG. 2 is a block diagram illustrating an imaging system 200, in accordance with an embodiment of the invention. The illustrated embodiment of imaging system 200 includes an image sensor array 205, readout circuitry 210, function logic 215, and control circuitry 220.

Image sensor array 205 is a two-dimensional ("2D") array of image sensors or pixels (e.g., pixels P1, P2 . . . , Pn). In one embodiment, each pixel is a complementary metal-oxide-semiconductor ("CMOS") imaging pixel. Image sensor array 205 may be implemented as either a front side illuminated image sensor array or a backside illuminated image sensor array. In one embodiment, image sensor array 205 includes a color filter pattern, such as a Bayer pattern or mosaic of red, green, and blue additive filters (e.g., RGB, RGBG or GRGB), a color filter pattern of cyan, magenta, yellow, and key (black) subtractive filters (e.g., CMYK), a combination of both, or otherwise. As illustrated, each pixel is arranged into a row (e.g., rows R1 to Ry) and a column (e.g., column C1 to Cx) to acquire image data of a person, place, or object, which can then be used to render a 2D image of the person, place, or object.

After each pixel has acquired its image data or image charge, the image data is readout by readout circuitry 210 and transferred to function logic 215. Readout circuitry 210 may include amplification circuitry, analog-to-digital ("ADC") conversion circuitry, or otherwise. Function logic 215 may simply store the image data or even manipulate the image data by applying post image effects (e.g., crop, rotate, remove red eye, adjust brightness, adjust contrast, or otherwise). In one embodiment, readout circuitry 210 may readout a row of image data at a time along readout column lines (illustrated) or may readout the image data using a variety of other techniques (not illustrated), such as a column readout, a serial readout, or a full parallel readout of all pixels simultaneously.

Control circuitry 220 is coupled to image sensor array 205 to control operational characteristic of image sensor array 205. For example, control circuitry 220 may generate a shutter signal for controlling image acquisition. In one embodiment, the shutter signal is a global shutter signal for simultaneously enabling all pixels within image sensor array 205 to simultaneously capture their respective image data during a single acquisition window (exposure period). In an alternative embodiment, the shutter signal is a rolling shutter signal whereby each row, column, or group of pixels is sequentially enabled during consecutive acquisition windows.

Figure 3:
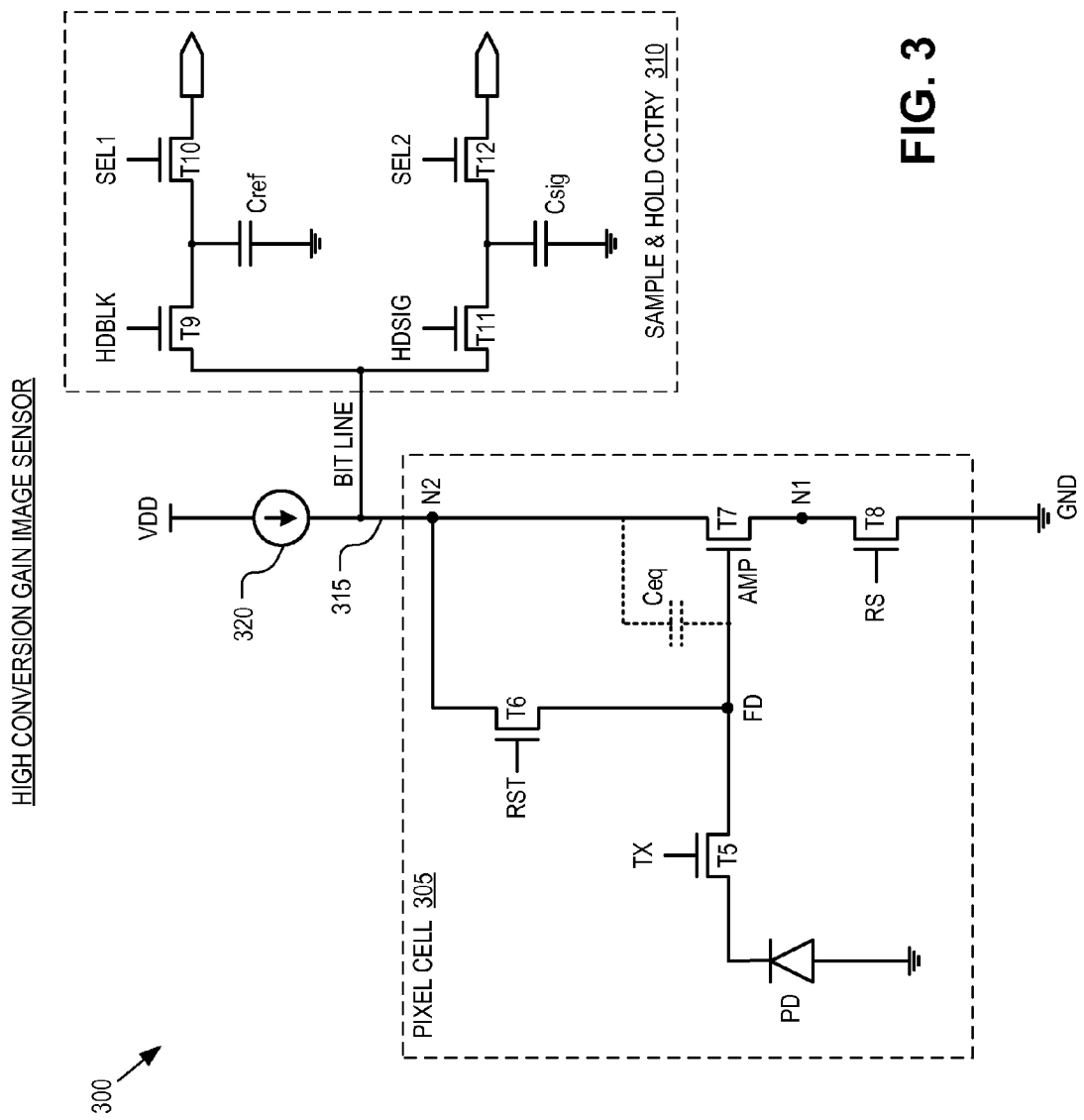
FIG. 3 is a circuit diagram illustrating a high conversion gain image sensor, in accordance with an embodiment of the invention.

FIG. 3 is a circuit diagram illustrating a high conversion gain image sensor 300, in accordance with an embodiment of the invention. Image sensor 300 represents one possible embodiment of image sensor circuitry (pixel circuitry) for implementing pixels P1-Pn of pixel array 205. The illustrated embodiment of image sensor 300 includes a pixel cell 305, sample and hold circuitry 310, a bit line 315, and a current source 320. The illustrated embodiment of pixel cell 305 includes a photosensitive element PD (e.g., photodiode, CCD, etc.), a transfer transistor T5, a floating diffusion (circuit node FD), a reset transistor T6, a source-follower amplifier ("AMP") transistor T7, and a row select ("RS") transistor T8. The illustrated embodiment of sample and hold circuitry 310 includes a hold transistor T9, a reference capacitor Cref, a select transistor T10, a hold transistor T11, a signal capacitor Csig, and a select transistor T12.

During operation, reset transistor T6 selectively resets the voltage on node FD coupled to the gate terminal of AMP transistor T7 under control of a reset signal RST. The PD generates an image charge in response to incident light, which is subsequently transferred to node FD through transfer transistor T5 under control of the transfer signal TX. The voltage at circuit node FD biases the gate terminal of AMP transistor T7. AMP transistor T7 provides a high impedance connection to circuit node FD and generates an output signal on bit line 315 indicative of the bias voltage on its gate terminal at circuit node FD. In one embodiment, sample and hold circuitry 310 is time shared by a plurality of pixel cells 305 coupled to bit line 315. RS transistor T8 is used select which row within pixel array 205 to transfer an image signal into sample and hold circuitry 310 at a given time under control of the row select signal RS.

Image sensor 300 may operate by first acquiring a black level reference signal from pixel cell 305, next acquiring an image signal from pixel cell 305, and then using the black level reference signal as a sort of offset value to cancel out circuit noise (e.g., thermal noise). The black level reference signal may be acquired by asserting the HDBLK signal to sample the black level reference signal output from pixel cell 305 on bit line 315 with reference capacitor Cref. The sampled black level reference signal may subsequently be output from sample and hold circuitry 310 through select transistor T10 under control of select signal SEL1. Similarly, the image signal may be acquired by asserting the HDSIG signal to sample the image signal output from pixel cell 305 on bit line 315 with signal capacitor Csig. The sampled image signal may subsequently be output from sample and hold circuitry 310 through select transistor T12 under control of select signal SEL2.

The illustrated embodiment of image sensor 300 is configured to operate as a high conversion gain pixel. In this embodiment, current source 320 is coupled between a high level voltage/power rail VDD and a channel terminal of AMP transistor T7. A channel terminal is a generic term intended to represent either a source or drain terminal. Furthermore, RS transistor T8 is coupled between the other channel terminal of AMP transistor T7 and a low level voltage/power rail GND. Finally, reset transistor T6 couples circuit node FD (also gate terminal of AMP transistor T7) to a node N2 on bit line 315 between the current source 320 and the high side channel terminal of AMP transistor T7. In contrast, standard conversion gain pixels typically couple circuit node FD directly to VDD during reset.

Capacitor Ceq coupling the circuit node FD to node N2 is not a physical capacitor; but rather, represents the equivalent coupling capacitance between the gate and high side channel terminal of AMP transistor T7. This inherent capacitive coupling helps boost the voltage at circuit node N2 by transferring charge driven into the high side channel terminal of AMP transistor T7 to its gate terminal.

Figure 4:
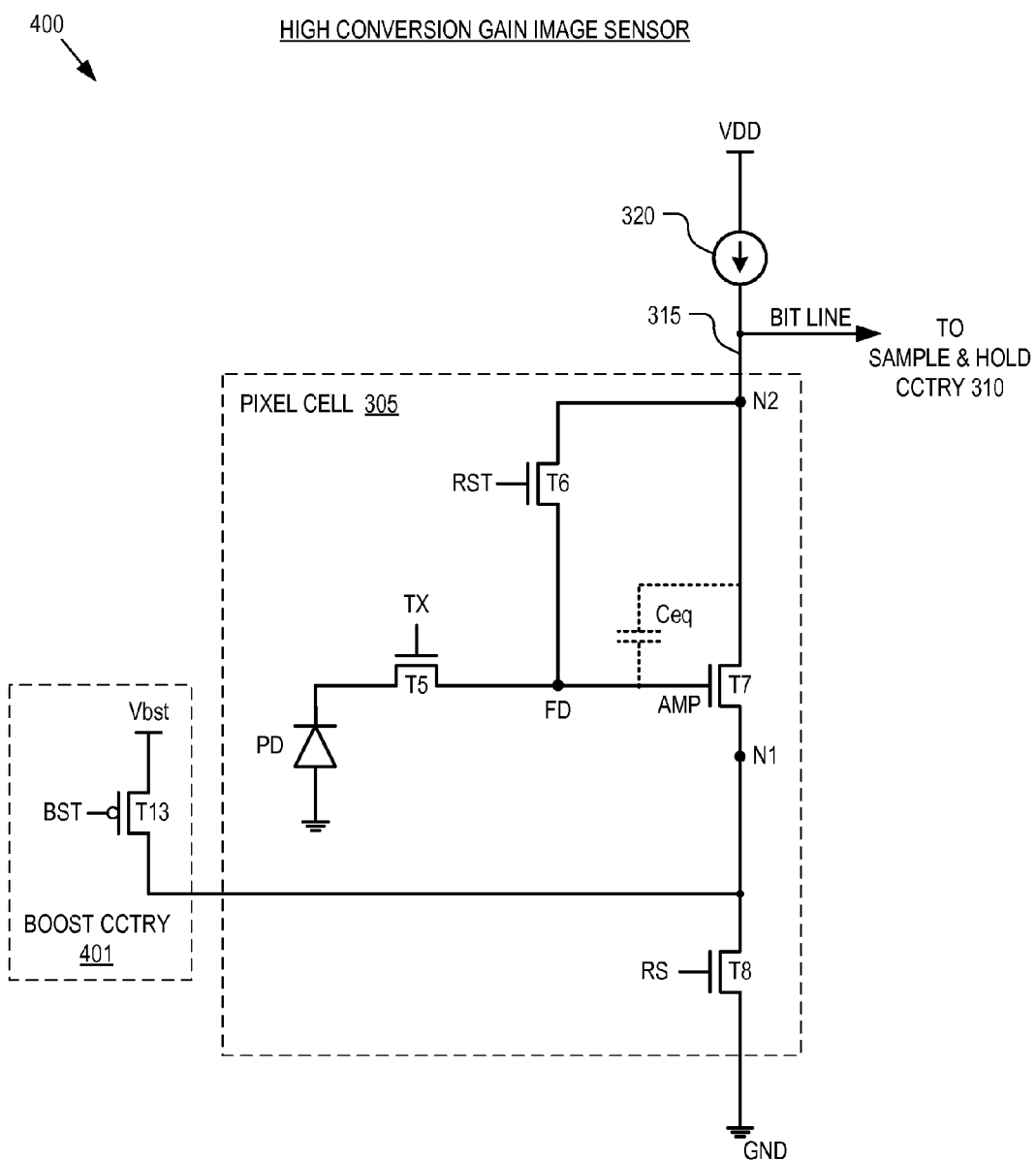
FIG. 4 is a circuit diagram illustrating a high conversion gain image sensor including a voltage boost circuit, in accordance with an embodiment of the invention.

FIG. 4 is a circuit diagram illustrating a high conversion gain image sensor 400 including pixel cell 305 and boost circuitry 401, in accordance with an embodiment of the invention. Image sensor 400 represents another possible embodiment of image sensor circuitry that could be used to implement pixels P1-Pn of pixel array 205. Image sensor 400 is similar to image sensor 300 except boot circuitry 401 is coupled to node N1 between the low side channel terminal of AMP transistor T7 and RS transistor T8.

In the illustrated embodiment, boost circuitry 401 includes a PMOS type transistor T13 having channel terminals coupled between node N1 and a boost voltage rail Vbst. In one embodiment, Vbst is equivalent to VDD. In other embodiments, Vbst may be higher or lower than VDD. Transistor T13 is selectively enabled under control of a boost signal BST, to temporarily boost the voltage at node N1 on the low side channel terminal of AMP transistor T7. Boost circuitry 401 may be implemented with alternative circuitry capable of selectively applying a pre-determined voltage to node N1. In short, boost circuitry 401 temporarily boosts the voltage at node N1, which indirectly boosts the voltage at circuit node FD, thereby providing greater margin for voltage swing at circuit node FD. Further discussion of this voltage boost technique is provided below in connection with FIG. 6.

Figure 5:
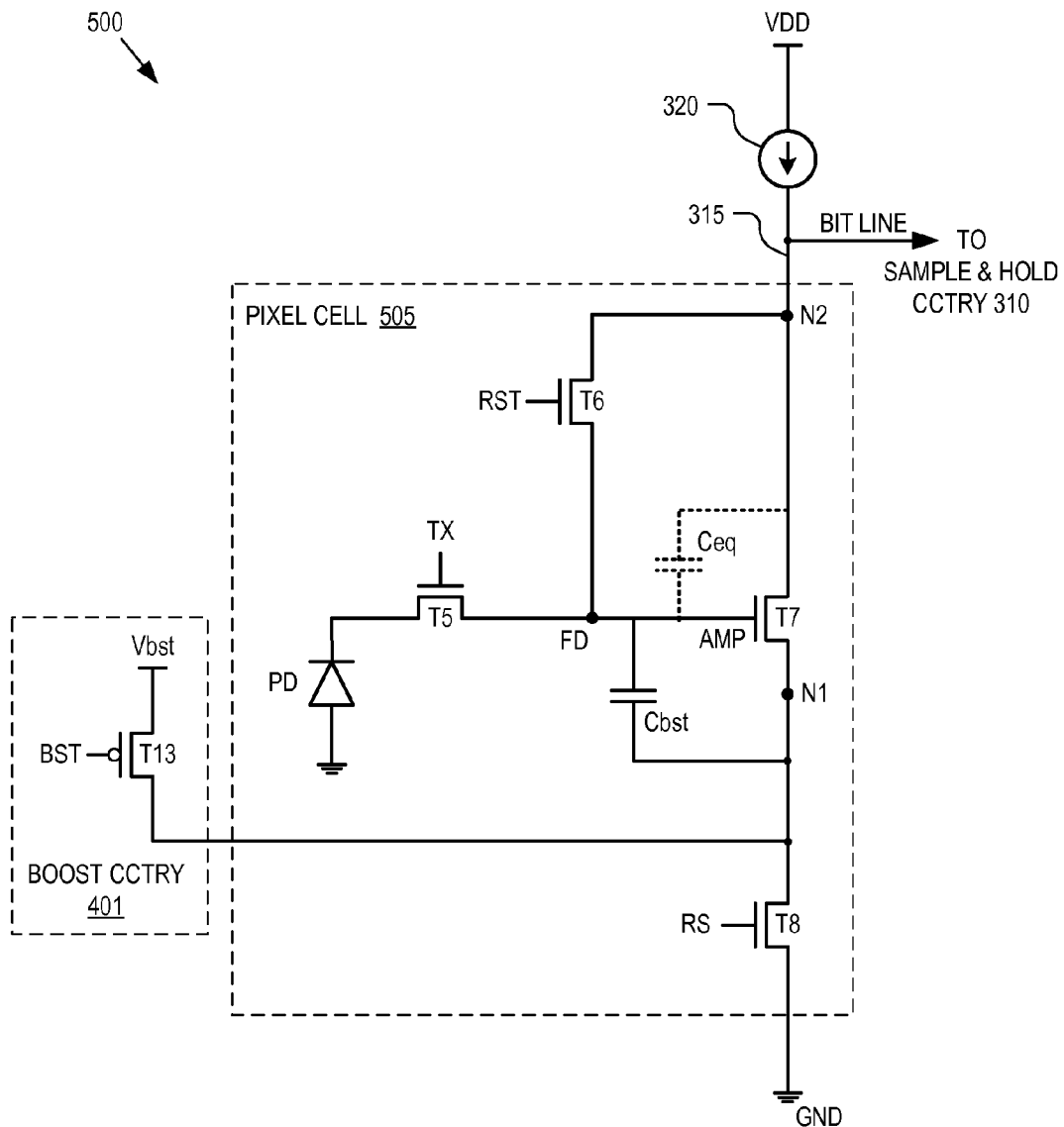
FIG. 5 is a circuit diagram illustrating a high conversion gain image sensor including a voltage boost circuit and a boost capacitor, in accordance with an embodiment of the invention.

FIG. 5 is a circuit diagram illustrating a high conversion gain image sensor 500 including a pixel cell 505 and boost circuitry 401, in accordance with an embodiment of the invention. Image sensor 500 represents another possible embodiment of image sensor circuitry that could be used to implement pixels P1-Pn of pixel array 205. Image sensor 500 is similar to image sensor 300 except for the inclusion of boot circuitry 401 and a boost capacitor Cbst coupled between node N1 and circuit node FD. Boost capacitor Cbst is an actual physical or discrete capacitor which may be implemented with a variety of capacitive circuit elements including a metal-insulator-metal capacitor, a polysilicon capacitor, or otherwise. The presence of boost capacitor Cbst coupling the gate terminal of AMP transistor T7 to one of its channel terminals further promotes voltage boost at circuit node FD via charge transfer from node N1.

Figure 6:
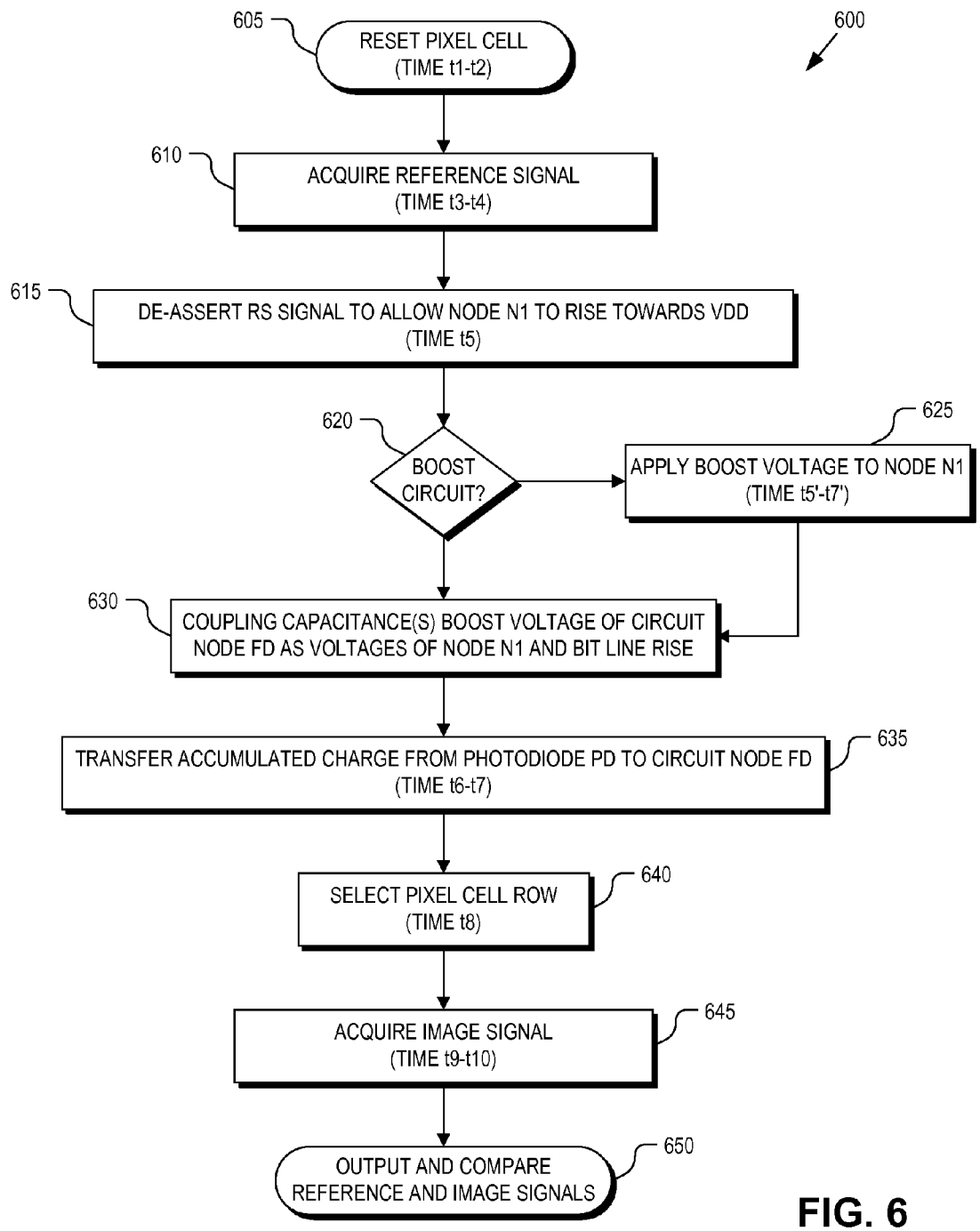
FIG. 6 is a flow chart illustrating operation of a high conversion gain image sensor having an increased voltage swing at the floating diffusion node, in accordance with an embodiment of the invention.

FIG. 6 is a flow chart illustrating operation of a high conversion gain image sensor, in accordance with an embodiment of the invention. Process 600 is described with reference to timing diagram 700 (FIG. 7) and the circuit diagrams illustrated in FIGS. 3, 4, and 5. The order in which some or all of the process blocks appear in process 600 should not be deemed limiting. Rather, one of ordinary skill in the art having the benefit of the present disclosure will understand that some of the process blocks may be executed in a variety of orders not illustrated.

Figure 7:
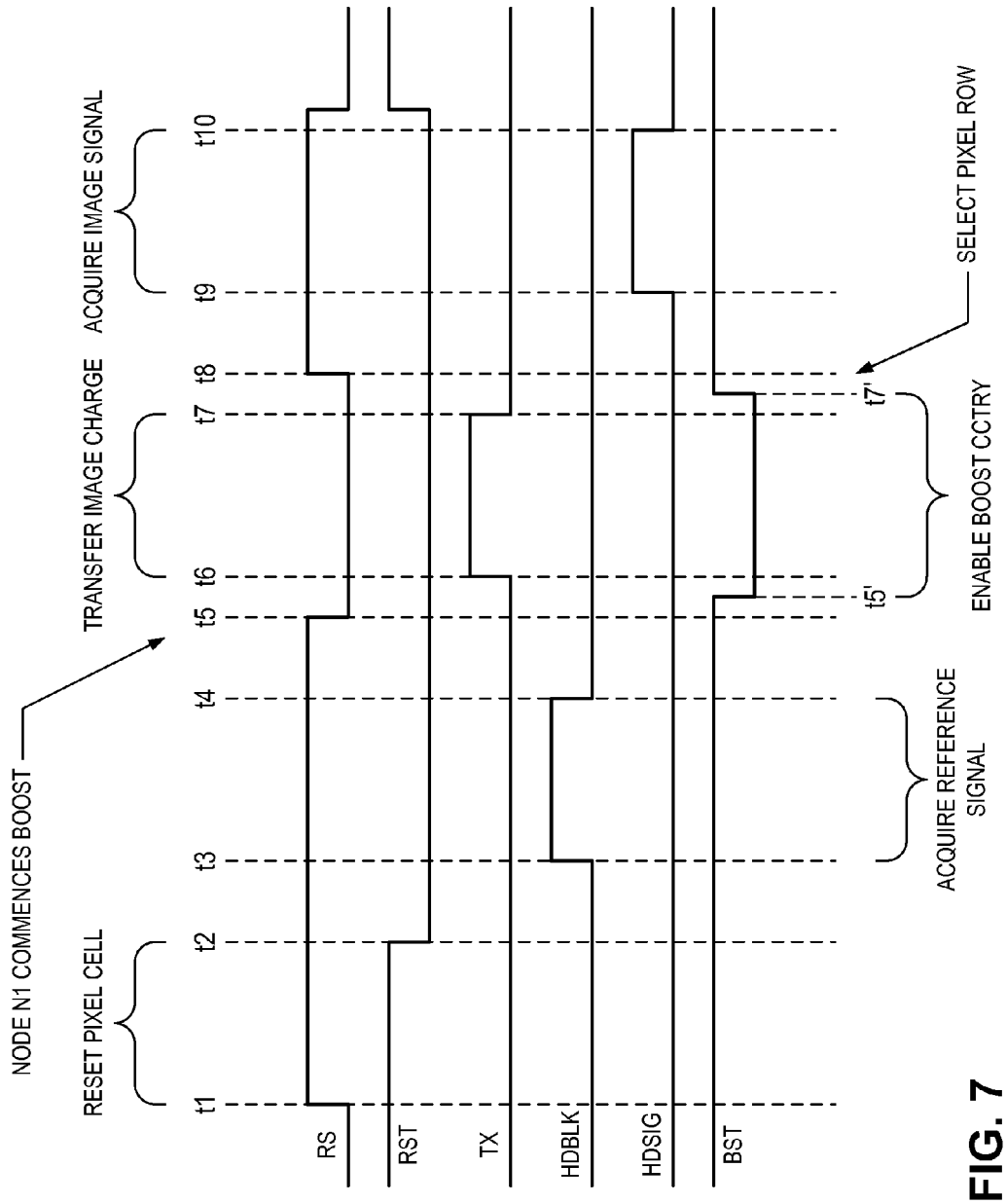
FIG. 7 is a timing diagram illustrating operation of a high conversion gain image sensor, in accordance with an embodiment of the invention.

In a process block 605, the pixel cell (e.g., pixel cell 305 or 505) is reset. In one embodiment, the pixel cell is reset by asserting the signal RS to enable RS transistor T8 and by asserting the reset signal RST to couple circuit node FD to node N2. FIG. 7 illustrates both RS and RST high enabled during times t1-t2. Resetting causes the voltage at circuit node FD to rise towards VDD as it is charged by the current output from current source 320 on bit line 315. The voltage at circuit node FD will continue to rise towards VDD until the gate voltage on AMP transistor T7 is such that the current flowing through AMP transistor T7 matches the current output from current source 320 on bit line 315. At this point, the voltage at node N2 reaches a steady state value.

After the reset window (time t1-t2), the reset signal is de-asserted while the row select signal RS continues to be asserted as a mechanism to select the particular pixel cell. In a process block 610, a reference signal is acquired from the pixel cell to capture the steady state voltage value at node N2. The reference signal is used to offset the image signal later acquired. It should be appreciated that the order in which image signal and reference signal are acquired can be swapped. The reference signal may be thought of as a black level reference signal, since no charge has been transferred from the PD to circuit node FD at this point. As such, the voltage at circuit node FD remains relatively constant—similar to a dark room environment during image acquisition. To acquire the reference signal, the voltage at circuit node N2 is sampled and held by temporarily coupling capacitor Cref to bit line 315 via transistor T9 under control of the signal HDBLK (time t3-t4).

In a process block 615, the RS signal is de-asserted to open circuit RS transistor T8 (time t5). When RS transistor T8 is open circuited, the voltage at node N1 will begin to rise from near GND towards VDD, while bit line 315 will also pull near VDD. In the embodiment of pixel cell 305 (FIGS. 3 and 4), the circuit equivalent capacitance Ceq acts to boost the voltage at circuit node FD by coupling charge driven onto bit line 315 by current source 320 to circuit node FD. In the embodiment of pixel cell 505, the presence of the additional boost capacitor Cbst between node N1 and circuit node FD further promotes a voltage boost at circuit node FD (process block 630).

If the image sensor includes boost circuit 401 (image sensors 400 and 500) (decision block 620), then the boost voltage Vbst is applied to circuit node N1 by asserting the signal BST (process block 625, time t5'-t7'). Application of the boost voltage Vbst to node N1 provides additional voltage boost to circuit node FD through the capacitive coupling of boost capacitor Cbst (process block 630).

In a process block 635, charge accumulated on the PD during an exposure period is transferred to circuit node FD via transfer transistor T5 under control of the transfer signal TX (time t6-t7). In a process block 640, the row select signal RS is re-asserted to permit current to flow through the channel of AMP transistor T7 to ground (time t8). Transfer of the photo-electrons causes the voltage on circuit node FD to drop by an amount indicative of the intensity of light incident on the PD. The drop in the voltage at circuit node FD after charge transfer causes the gate-source voltage Vgs of AMP transistor T7 to decrease. In turn, this results in a drop of the channel current through AMP transistor T7 to a value below the bit line current output from current source 320. Bit line 315 will then be pulled towards VDD by the unbalanced current and builds charge at node N2. At the same time, the voltage at circuit node FD will also rise due to the capacitive coupling effect of Ceq. Eventually, the voltage at circuit node FD will stabilize at a new equilibrium voltage that balances the current on bit line 315 with the current passing through AMP transistor T7. The voltage on circuit node FD will stabilize at a final voltage relatively close to the voltage at circuit node FD when the reference signal was sampled, but the voltage on bit line 315 will change by an amount approximately equal to the ratio of the charge transferred from the PD and the effective capacitance of Ceq.

Since the initial voltage (pre-transfer voltage) on circuit node FD was boosted, a large voltage swing is available at gate terminal of AMP transistor T7. As such, the image sensor has a larger dynamic range, can operate in brighter environments, and achieves this greater dynamic range with little or no tradeoff of conversion gain.

In a process block 645, an image signal is acquired from the pixel cell to capture the steady state voltage value at node N2. To acquire the image signal, the voltage at circuit node N2 is sampled and held by temporarily coupling capacitor Csig to bit line 315 via transistor T11 under control of the signal HDSIG (time t9-t10). Finally, in a process block 650, the reference signal and the image signal are transferred out of sample and hold circuitry 310 under control and select signals SEL1 and SEL2 and compared. In one embodiment, the reference signal is used to apply an offset value to the image signal.

Figure 8:
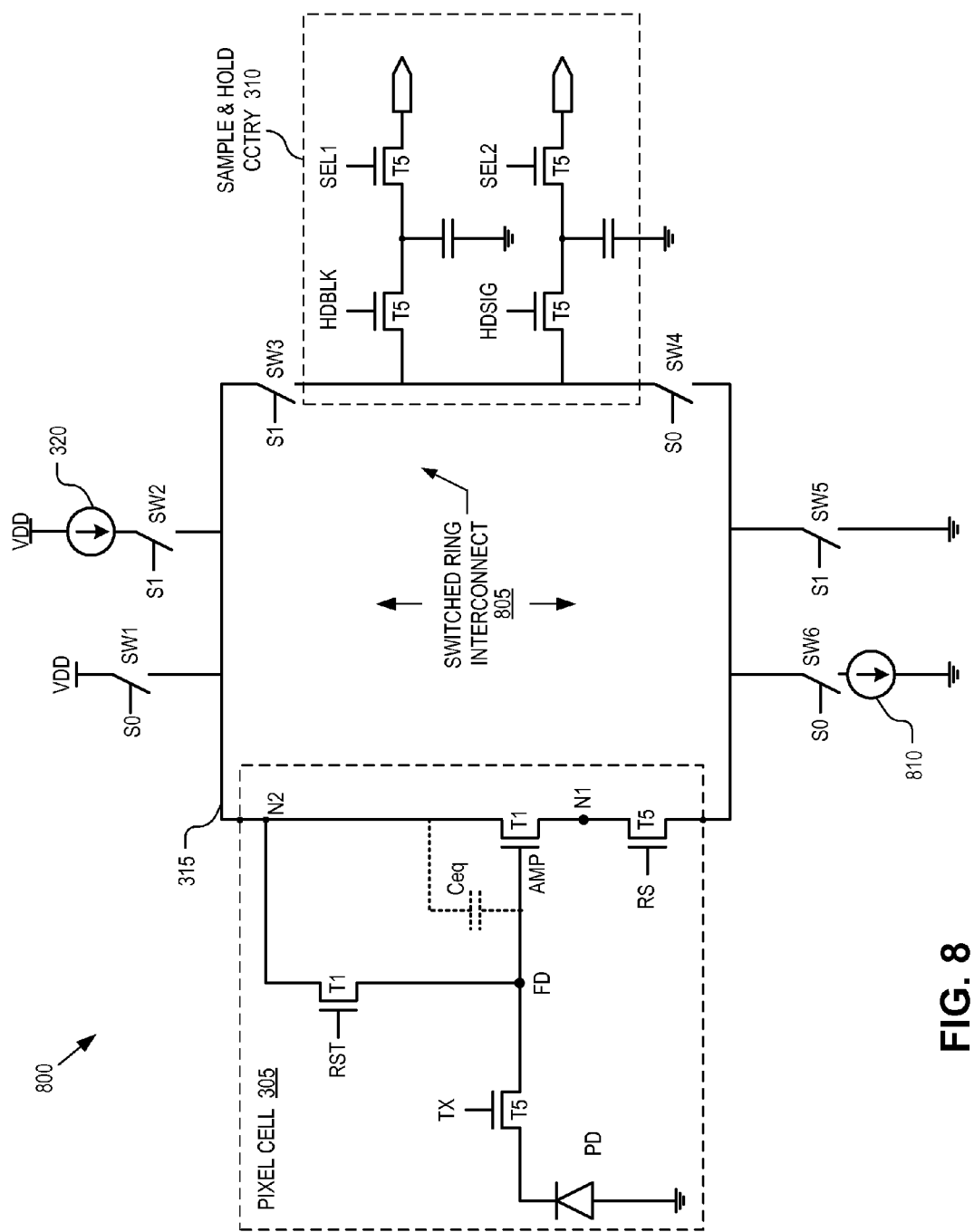
FIG. 8 is a circuit diagram illustrating configurable pixel circuitry for implementing a standard gain image sensor and a high conversion gain image sensor, in accordance with an embodiment of the invention.

FIG. 8 is a circuit diagram illustrating configurable pixel circuitry 800 for selectively implementing a standard gain image sensor and a high conversion gain image sensor, in accordance with an embodiment of the invention. The illustrated embodiment of configurable pixel circuitry 800 includes a switched ring interconnect 805, switches SW1-SW6, pixel cell 305, sample and hold circuitry 310, current source 320, and a current source 810. Although FIG. 8 illustrates configurable pixel circuitry 800 as including pixel cell 305, other embodiments may substitute pixel cell 305 for pixel cell 505 and optionally include boost circuitry 401.

Figure 9:
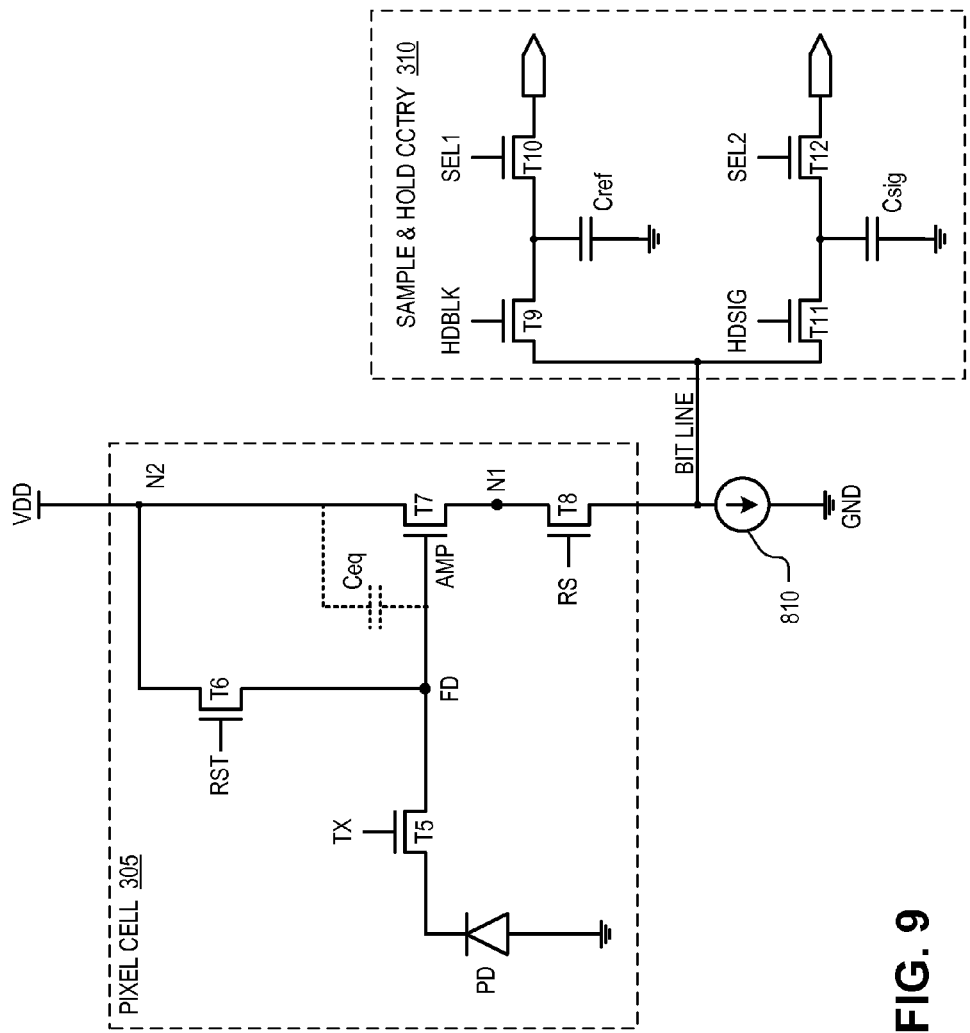
FIG. 9 is a circuit diagram illustrating a standard conversion gain image sensor, in accordance with an embodiment of the invention.

Configurable pixel circuitry 800 can be reconfigured during regular or in-use operation by appropriate assertion of control signals S0 and S1, to selectively alternate between a high conversion gain image sensor and a standard conversion gain image sensor. When S1 is asserted and S0 de-asserted, switches SW1-SW6 configure configurable pixel circuitry 800 to implement high conversion gain image sensor 300 illustrated in FIG. 3. When S1 is de-asserted and S0 is asserted, then configurable pixel circuitry 800 is configured as a standard conversion gain image sensor, as illustrated in FIG. 9.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. Image sensor circuitry, comprising:
pixel cell circuitry for acquiring an image charge in response to incident light and generating an image signal indicative of the image charge;
sample and hold circuitry to sample and hold the image signal;
a bit line coupled between the pixel cell circuitry and the sample and hold circuitry; and
a current source coupled between a high voltage power rail and the bit line,
wherein the pixel cell circuitry includes:
a photosensitive element coupled to a first circuit node, the photosensitive element for generating the image charge in response to the incident light and transferring the image charge to the first circuit node; and
an amplifier transistor having a gate terminal coupled to the first circuit node and a second terminal coupled to the current source and the bit line, wherein the bit line couples the sample and hold circuitry to a second circuit node between the current source and the second terminal of the amplifier transistor,
wherein the image sensor circuitry further includes boost circuitry coupled to selectively boost a voltage potential of a third terminal of the amplifier transistor and wherein the boost circuitry is coupled to the third terminal which is opposite the second terminal to which the current source and the bit line are coupled.

2. The image sensor circuitry of claim 1, wherein the first circuit node comprises a floating circuit node and wherein the pixel cell circuitry further comprises:
a transfer switch coupled between the photosensitive device and the floating circuit node.

3. The image sensor circuitry of claim 2, wherein the pixel cell circuitry further comprises:
a select transistor coupled between a third terminal of the amplifier transistor and a low voltage power rail; and
a reset transistor coupled between the floating circuit node and the bit line to selectively reset a voltage of the floating circuit node.

4. The image sensor circuitry of claim 3, further comprising a boost capacitor having a first terminal coupled to the floating circuitry node and a second terminal coupled to the third terminal of the amplifier transistor.

5. The image sensor circuitry of claim 1, wherein the pixel cell circuitry, the sample and hold circuitry, and the current source are selectively coupled to each other through a switched ring interconnect.

6. The image sensor circuitry of claim 5, wherein the switched ring interconnect is configurable to selectively disconnect the current source and selectively connect a second signal source between the pixel cell circuitry and a low voltage power rail.

7. The image sensor circuitry of claim 6, wherein the switched ring interconnect is coupled to selectively configure the pixel cell circuitry in a high conversion gain configuration or a standard conversion gain configuration having a lower conversion gain than the high conversion gain configuration.

8. The image sensor circuitry of claim 1 wherein the current source is coupled directly to the bit line without an intervening transistor.

9. An image sensor, comprising:
pixel cell circuitry for acquiring an image charge in response to incident light and generating an image signal indicative of the image charge;
sample and hold circuitry to sample and hold the image signal;
a bit line coupled to the pixel cell circuitry;
a first current source selectively coupled between a high voltage power rail and the bit line to drive a first current onto the bit line between the pixel cell circuitry and the sample and hold circuitry;
a second current source selectively coupled between the pixel cell circuitry and a low voltage power rail;
a switched ring interconnection including switches to selectively couple the pixel cell circuitry, the sample and hold circuitry, and the first and second current sources to each other via selective enablement of the switches of the switched ring interconnect, wherein the switched ring interconnection includes:

a first group of switches coupled to be responsive to a first control signal, the first group of switches to selectively couple the bit line to the high voltage rail, the second current source to the pixel cell circuitry, and the sample and hold circuitry to a node between the pixel cell circuitry and the second current source when the first control signal is asserted to configure the pixel cell circuitry into a standard conversion gain configuration; and a second group of switches coupled to be responsive to a second control signal, the second group of switches to selectively couple the bit line to the sample and hold circuitry, the first current source to the bit line between the sample and hold circuitry and the pixel cell circuitry, and the low voltage rail to the pixel cell circuitry when the second control signal is asserted to configure the pixel cell circuitry into a high conversion gain configuration.

* * * * *

UNITED STATES PATENT AND TRADEMARK OFFICE
CERTIFICATE OF CORRECTION

PATENT NO. : 8,299,513 B2
APPLICATION NO. : 12/112907
DATED : October 30, 2012
INVENTOR(S) : Tiejun Dai Page 1 of 1

It is certified that error appears in the above-identified patent and that said Letters Patent is hereby corrected as shown below:

In the Claims:

In Column 8, line 27, (claim 3, line 3) delete "a" and replace with -- the --. (second occurrence)

Signed and Sealed this
Third Day of September, 2013

Teresa Stanek Rea
*Acting Director of the United States Patent and Trademark Office*